United States Patent [19]

Maatuk

[11] Patent Number: 5,730,026

[45] Date of Patent: Mar. 24, 1998

[54] MICROPROCESSOR-BASED LIQUID SENSOR AND ICE DETECTOR

[75] Inventor: Josef Maatuk, 1207 S. Holt #3, Los Angeles, Calif. 90035

[73] Assignee: Josef Maatuk, Los Angeles, Calif.

[21] Appl. No.: 414,239

[22] Filed: Mar. 31, 1995

[51] Int. Cl.[6] .................................................. G01F 23/22
[52] U.S. Cl. ................................................................ 73/295
[58] Field of Search ................................ 73/295; 374/15

[56] References Cited

U.S. PATENT DOCUMENTS

| | | | |
|---|---|---|---|
| 2,279,043 | 4/1942 | Harrington | 73/295 |
| 3,279,252 | 10/1966 | Barlow | 73/295 |
| 4,969,749 | 11/1990 | Hasselmann | 73/295 |
| 5,553,494 | 9/1996 | Richards | 73/304 R |

FOREIGN PATENT DOCUMENTS

| | | | |
|---|---|---|---|
| 44923 | 3/1980 | Japan | 73/295 |
| 158522 | 9/1982 | Japan | 73/295 |
| 14926 | 10/1991 | WIPO | 73/295 |

*Primary Examiner*—William A. Cuchlinski, Jr.
*Assistant Examiner*—Willie Morris Worth

[57] ABSTRACT

Apparatus and a method of operating any structural configuration of a heater and array of thermocouples to measure with high accuracy, the level of stratified liquids like water and oil or water and gasoline and non-stratified liquids, liquid temperature, and other liquid properties. Simultaneous measurements from all the temperature sensors, before and after heat is applied, will be used to generate accurate temperature profiles for the entire configuration and not just from two adjacent temperature sensors. Different features of the temperature profiles will determine accurately the liquid level, and other liquid properties.

9 Claims, 4 Drawing Sheets

5,730,026

MICROPROCESSOR-BASED LIQUID SENSOR AND ICE DETECTOR

TITLE OF THE INVENTION

Microprocessor-Based Liquid Sensor and Ice Detector.

DESCRIPTION OF THE PRIOR ART

Present Liquid Level measuring devices that are similar to this invention utilize a resistive type probe and rely on the change of resistivity of the probe with temperature.. A significant decrease in the resistivity of the probe over its value when it was measured in air indicates that the probe is submerged in liquid. Devices that rely on change in resistivity are usually only capable of determining whether or not a certain level, such as the location of the probe, is reached. Even when several probes are used, liquid levels can only be determined at discrete locations of the probe. Intermediate levels between two probes can not be determined. Resistive probes are only accurate at the temperatures in which they are calibrated. They need to be re-calibrated at other operating temperatures. Furthermore, resistive probes usually require compensating resistors or circuits, resulting in a network that is susceptible to electromagnetic interference or electrical noise from other electrical/electronic equipment within its vicinity.

This invention precludes the shortcomings inherent in liquid level devices employing resistive probes, because actual temperature are used and processed, and the temperatures measured are dependent on heat transfer mechanisms rather than change in resistivity of the probe material. Furthermore, the invention is capable of not only determining liquid level at discrete points where the temperature sensors are located, but can also measure liquid levels at intermediate points between two temperature sensor locations, which the resistive type device is incapable of doing.

SUMMARY OF THE INVENTION

The invention described herein is a means of measuring the level of a liquid in a liquid container such as a fuel tank by means of a probe to which heat is applied and the temperature along the length of the probe is measured. This invention makes use of the difference in cooling efficiency between liquid and gas such as air, or between two different liquids, such as water and oil. When heat is applied to the probe, the temperature of the portion of the probe submerged in liquid is significantly lower than the temperature of that portion of the probe outside of the liquid and typically exposed to air. This is because the liquid removes heat at faster rate than air, so that the temperature difference between the surface of the probe is much lower in liquid than it is in air. This is also true between a liquid that removes heat more efficiently, such as water, and a liquid that does not remove heat as efficiently, such as oil. Temperature sensors, such as thermocouples or thermistors that are attached to various points on the probe measure the temperatures at those respective locations on the probe. This invention is not only capable of determining where the liquid level is at discrete points where the temperature sensors are attached, it can also determine where the liquid level is between two discrete points to within a fraction of centimeter accuracy, when precision temperature measurement devices are used in conjunction with suitable microprocessor, which process the signals received from the temperature sensors.

The purpose of this invention is to provide a device that can measure liquid levels, such as that of fuel in an automobile fuel tank or lubrication oil level in an automobile engine compartment fairly accurately and with minimal effort, such as simply pushing a button on an instrument panel, as shown in FIG. 1. The advantages of this invention are (1) It can measure liquid levels accurately, within a fraction of a centimeter; (2) It requires very small amount of power to operate; (3) It is compact and light weight and can be installed in relatively small liquid containers if necessary; (4) It is reliable since it has no moving parts; (5) because it requires a very small power for operation, it does not generate any significant amount of electromagnetic energy which could interfere with the performance of other electrical/electronic equipment; and (6) with certain modifications to the device, it can be used to measure other important liquid parameters such as viscosity and density. This device can also be adopted for the detection of ice formation on the external surface of an aircraft, such as the external surface of an aircraft wing or fuel tank.

DETAILED DESCRIPTION OF THE INVENTION

Figure 1:
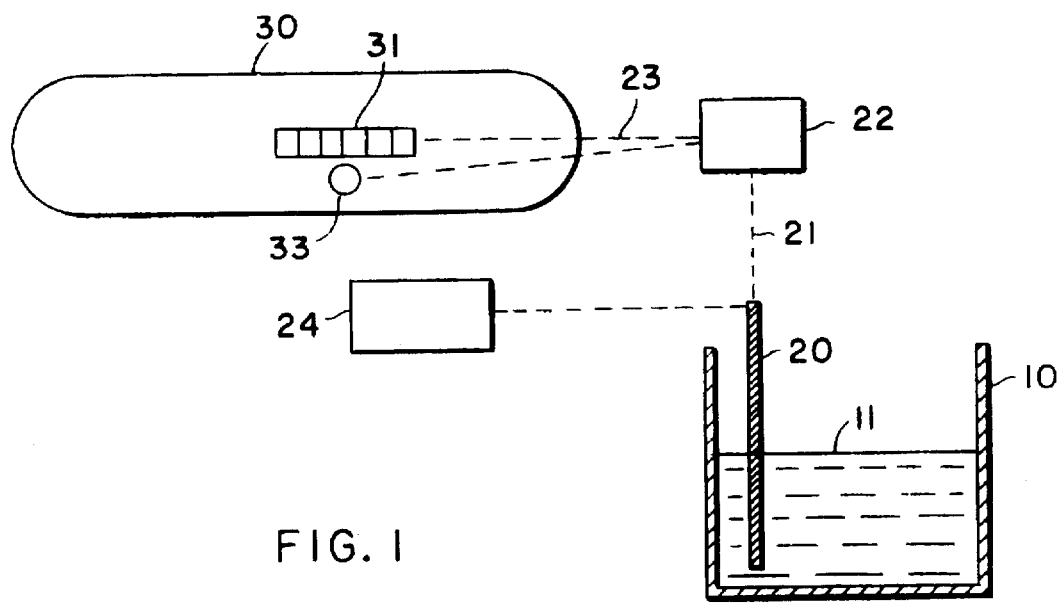
FIG. 1 is a schematics of a typical liquid level measuring device application.

A typical application of the liquid level measuring apparatus is measuring the liquid level of fuel in an automobile fuel tank or lubrication oil level in an automobile engine compartment. A schematic diagram of such an application is shown in FIG. 1. The schematic diagram in FIG. 1 depicts an automobile engine oil pan 10 containing lubrication oil 11. The liquid level sensor probe 20 is installed inside the oil pan 10. A plurality of electrical wires 21 connect the probe 20 to a microprocessor 22 which may be located behind the automobile instrument panel 30. The microprocessor is in turn connected by one or more wires 23 to a display 31 located on the automobile control panel 30. A power supply 24 made of one or two batteries is located either in the engine compartment, behind the automobile control panel or close to the probe and electrically connected to the microprocessor 22, the probe 20 and an activation button or switch 33 located on the automobile control panel, provides electrical energy to the liquid level sensing system. Sensing of the lubrication oil level is accomplished by activating the button or switch 33, sending electrical energy to the probe 20 and the microprocessor 22. The lubrication oil level is displayed on the display 31.

Figure 2:
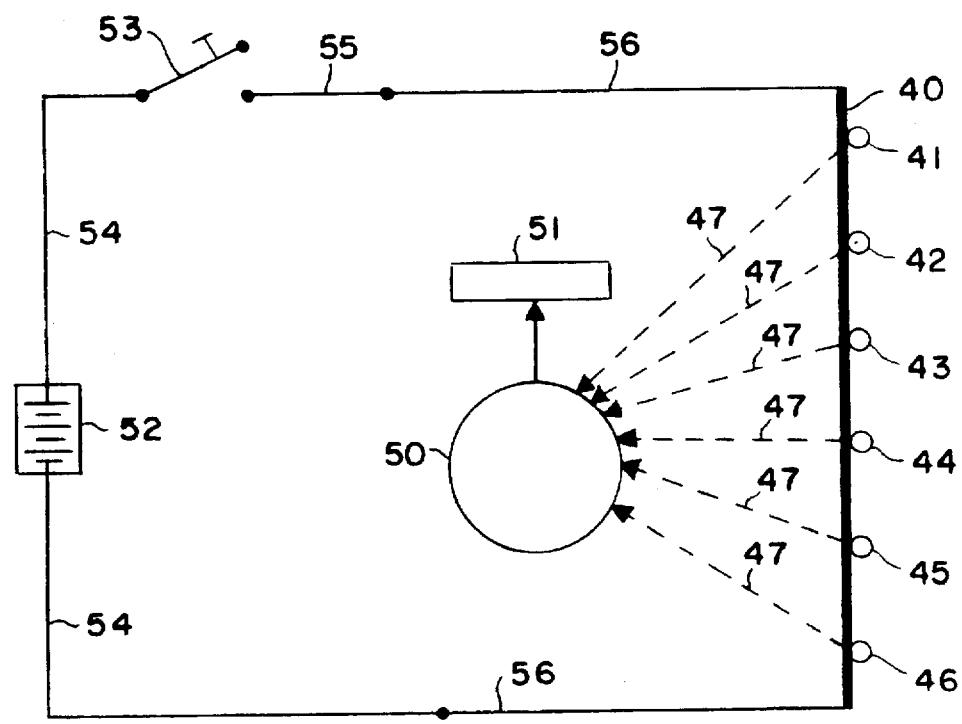
FIG. 2 is a schematic diagram of one embodiment of the invention.

The apparatus makes use of the cooling efficiency between liquid and gas, such as air, or between two different liquids such as water and oil. One embodiment of the invention is depicted schematically in FIG. 2. The embodiment depicted schematically in FIG. 2 is comprised of a probe 40 made from 0.002 inch diameter Nichrome wire three inches in length but maybe of any suitable lengths, a microprocessor 50, a display 51, an electrical power source 52, a switch 53, electrical wires 54 and, connecting wires 56. Six thermocouples beads 41, 42, 43, 44, 45 and 46 from 0.008 inch diameter or Copper-Constantan pairs of wires are attached to the probe 40 by wrapping the probe Nichrome wire around the thermocouples beads 41 through 46. The number of thermocouples beads may be varied depending on the length of the probe and the accuracy desired. The thermocouples 41 through 46 are electrically connected to the microprocessor by a Copper-Constantan wires 47 of suitable size and length. The probe 40 is coated with an insulative material to electrically isolate it from the thermocouples beads 41 through 46.

Referring again to FIG. 2, when the switch 53 is in the open position and no power is applied to the probe 40, the temperature of the thermocouples 41 through 46 will measure the same temperature as the media which surrounds the probe, either air or liquid or both. When the switch 53 is in the closed position, a current flows through the circuit including the probe and heat is generated at the probe 40 in the form of $I^2R$ losses. The heat generated at the probe 40 is dissipated to the surrounding medium. In order for heat to be dissipated to the surrounding medium the temperature of the probe has to be higher than that of the surrounding medium. At steady-state condition, that is when the temperatures have stabilized some time after the. switch 53 is closed, usually several seconds, the characteristics temperature difference between the medium and the probe 40 is established. For example, if 6.0 milliwatts of power is applied to the probe and the entire probe is in air which is maintained at a constant temperature of 20 degrees C., the temperature at the thermocouple location 41 through 46 are approximately 35 degrees C., approximately 15 degrees C. higher than the temperature of the surrounding air when Steady-state condition is reached. If the entire probe is immersed in water, also maintained at 20 degrees C., the temperature of the probe at the thermocouples 41–46 locations will only be slightly above 20 degrees C. The actual temperatures at the thermocouples locations are found in Table 1. This is because water can remove heat from the probe at much faster rate than air.

TABLE 1

TEMPERATURES AT 6 THERMOCOUPLE LOCATIONS

| THERMO-COUPLE NO. | LIQUID LEVEL DEVICE TEMPERATURES (DEG C.) | | |
|---|---|---|---|
| | ALL IN AIR | ALL IN WATER | TC 4, 5 & 6 IN WATER |
| 1 | 34.493 | 20.145 | 33.207 |
| 2 | 34.493 | 20.145 | 31.914 |
| 3 | 34.493 | 21.145 | 28.035 |
| 4 | 34.493 | 20.145 | 20.52 |
| 5 | 34.493 | 20.145 | 20.149 |
| 6 | 34.493 | 20.145 | 20.145 |

NOTE: BOTH AIR AND WATER TEMPERATURES = 20 DEG C.

Figure 3:
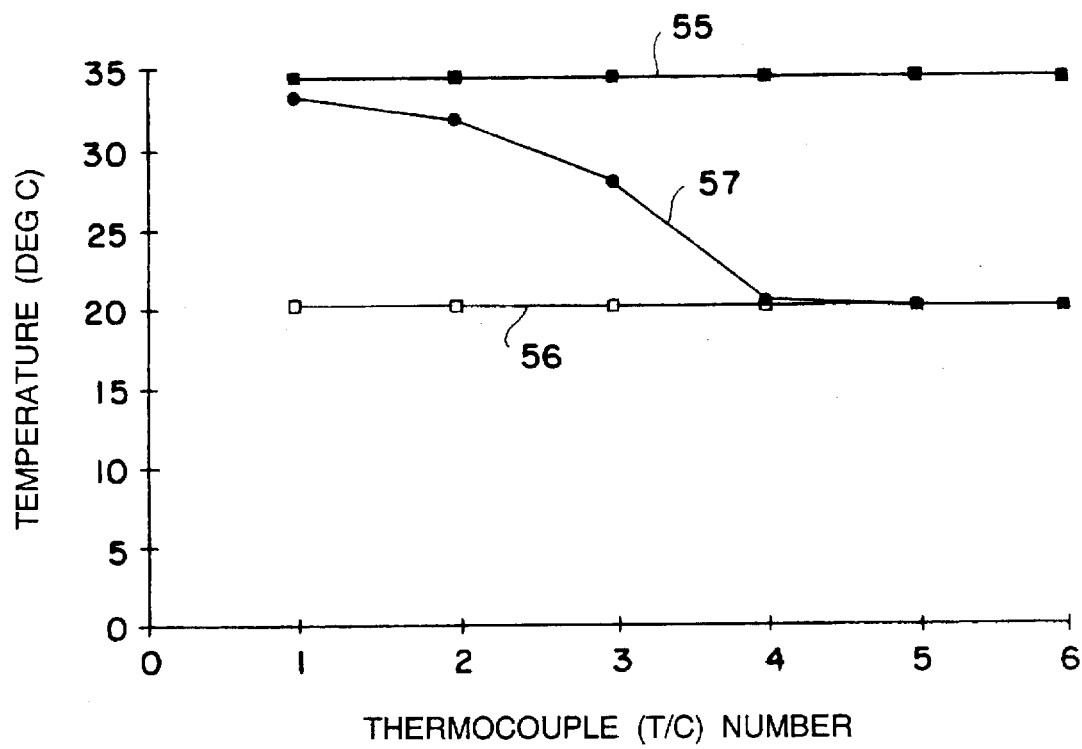
FIG. 3 Probe temperature profile.

So the water requires only a small temperature difference (less than 1 degree C.) to remove the same heating rate as the air has to remove. In FIG. 3, the temperature profile of the probe is shown for three conditions : (1) where the entire probe with 6.0 milliwatts power is in air whose temperature is 20 degrees C. (55), (2) where the probe is completely immersed in water whose temperature is 20 degrees C. (56), and (3) where the probe is immersed in water from thermocouples location 43 to 46, with both air and water maintained at 20 degrees C.

In this example heat is transferred from the surface of the probe to the surrounding medium by free convection. The basic convection heat transfer equation (applicable to both free and forced convection) is $$Q=HA(Tp-Tm) \qquad (1)$$

Where Q is the heat transfer rate

H is the convection (free convection in this case) heat transfer coefficient.

A is the area of the probe exposed to the medium

Tp is the temperature of the probe surface exposed to the medium

Tm is the temperature of the medium (air or water in this example)

The temperature difference between the probe surface and the medium is expressed as DT or $$DT=Tp-Tm=Q/(HA) \qquad (2)$$

In this example the values of Q and A in equations 1 and 2 are held constant. Only H, which is a measure of the heat transfer or heat removal efficiency, is varied. The higher H is the lower DT is. Water, which is a good heat transfer liquid, usually orders of magnitude better than air in removing heat from the probe both by free convection and forced convection. Therefore it requires a very small DT compared to that required by air in removing the same amount of heating rate or power.

When only liquid levels at discrete locations are desired, such as where the six thermocouples 41–46 are located, the processing of the temperature data becomes relatively simple. The points (thermocouples locations) that are completely immersed in water will indicate a much smaller DT. For example, if thermocouples 44, 45 and 46 are completely immersed in water and thermocouples 41, 42 and 43 are in air, the temperature of the six thermocouples 41–46 will not be constant. The DT's of the thermocouples immersed in water will be much lower. The temperature distribution along the probe when the thermocouples 41, 42 and 43 are in air and when thermocouples 44, 45 and 46 are immersed in water are shown as 57 in FIG. 3. From comparison of the difference in temperatures of the six thermocouples 41–46 to each other, it can be determined which thermocouples or discrete points are immersed in water.

Figure 4:
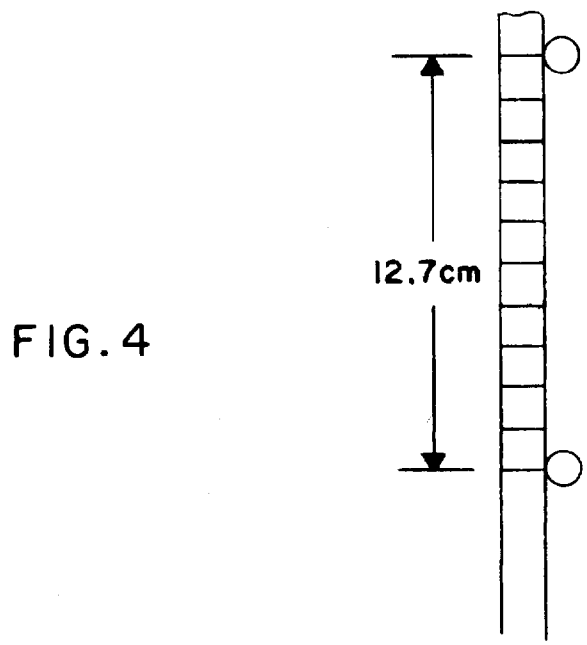
FIG. 4 Division of space thermocouples 43 and 44 into the equal increments for intermediate level reading.
Figure 5:
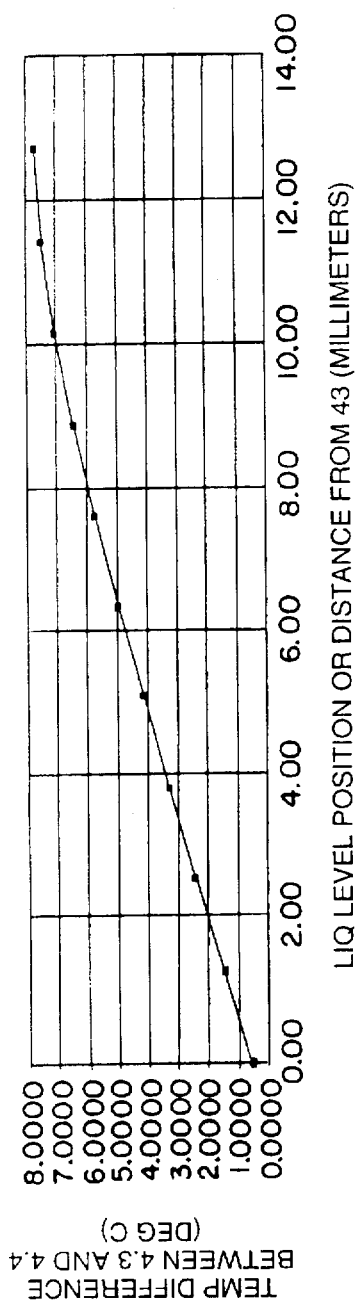
FIG. 5 Temperature difference between thermocouples 43 and 44 versus liquid level position between 43 and 44.

The invention can also be used to determine the liquid levels at intermediate points between the thermocouples locations. Supposing the liquid level is somewhere between thermocouple 43 and thermocouple 44 and it is desired to determine the location of the liquid level within 1.3 millimeter. The space between thermocouple 43 and thermocouple 44 of the probe 40 in the embodiment depicted in FIG. 2 is 12.7 millimeters. If the space is divided into ten equal spaces as shown in FIG. 4, the distance between each intermediate mark is 1.27 millimeters, within the 1.3 millimeter accuracy desired. Referring to FIG. 2 and FIG. 4, as the level of the water is varied from thermocouple 43 (o distance from thermocouple 43) one intermediate mark at a time to thermocouple 44 (12.7 millimeter distance from thermocouple 43), the actual temperature of thermocouple 43 and thermocouple 44 and the difference between the two temperatures will vary, as shown in Table 2 and FIG. 5. These data can be processed by the microprocessor to

TABLE 2

PROBE TEMPERATURES VS POSITION OF LIQUID LEVEL BETWEEN TC3 AND TC4

| POSITION DISTANCE FROM TC3* (MM) | TC3 TEMP DEG C. | TC4 TEMP DEG C. | TC3 – TC4 DEG C. |
| --- | --- | --- | --- |
| 0.00 | 20.6583 | 20.1445 | 0.5138 |
| 1.27 | 21.6055 | 20.1451 | 1.4604 |
| 2.54 | 22.5432 | 20.1454 | 2.3978 |
| 3.81 | 23.4567 | 20.1460 | 3.3107 |
| 5.08 | 24.3350 | 20.1477 | 4.1873 |
| 6.35 | 25.1703 | 20.1522 | 5.0181 |
| 7.62 | 25.9577 | 20.1644 | 5.7933 |
| 8.89 | 26.6949 | 20.1971 | 6.4978 |
| 10.16 | 27.3829 | 20.2842 | 7.0987 |
| 11.43 | 28.0347 | 20.5194 | 7.5153 |
| 12.70 | 28.7412 | 21.0100 | 7.7312 |

*SEE FIG. 3
NOTE: AIR AND WATER TEMP = 20 DEG C.

where the actual liquid level is. The thermocouples or equivalent temperature sensors used to measure the temperatures at the various locations will have to be able to provide much more accurate readings than when only discrete temperature levels are being measured. This can be accomplished by using the entire spatial profile of differential rather than absolute thermocouple readings.

The invention describe herein is one configuration. Other configurations, such as probes in the shape of very thin metallic strips deposited on a printed circuit board may be used. The principle of operation of the probe, which is the novel feature of this invention, applies to other configurations.

Experiments performed on a prototype similar to the configuration described in FIG. 2 indicated similar temperature profile trends as those predicted analytically, although the precision was not close to analytically predicted precision. This is because the sensors used in the prototype did not have the accuracy required for such precision. A photograph of the test setup used in performing the experiments is attached as "Photo B".

Figure 6:
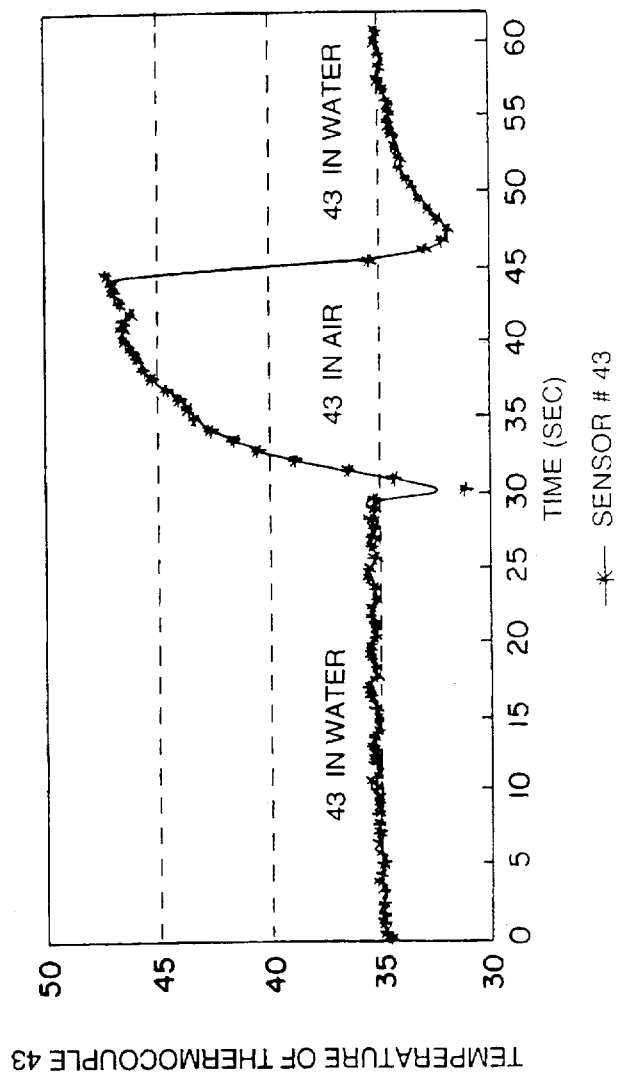
FIG. 6 Temperature behavior of 43 when initially immersed in water and then exposed to air.

The same experiments also indicated that the probe temperature momentarily dips in temperature when exposed to air after being immersed in water, is shown in FIG. 6. This is because the small amount of water entrained on the probe is evaporated, causing the temperature to dip. As the entrained water has been evaporated, the temperature of the probe then rises to the level of that when it is in air. This characteristics of the probe could be employed in the detection of ice formation on the external surface of an aircraft, because when the sensor is in ice, it is normally insulated thermally from the surrounding air or water, and the probe temperature is expected to rise.

The invention described (the strip is most useful design) herein will detect ice formation on the external surfaces of an aircraft, by characterizing the signature (detail in the profile) associated with the "Igloo effect" and the various forms of water, disturbing the heat flow. When the sensor is covered with ice, it is normally insulated thermally from the surrounding air or water. When the probe is heated, it is expected that its temperature will rise. However, if the amount of power applied to the probe is not too high then at the beginning of power application, the probe temperature will go down since the ice needs power to overcome its latent heat and melt a thin layer of ice. The volume of the melted ice is smaller than the volume of the ice and there will be an air gap between the melted water and the remaining ice. The additional heat that is applied to the probe will raise its temperature to the level expected when a surrounding wall ice, not in contact with the probe, insulates thermally the melted thin layer of ice from the environment. The transient and steady-state data will be used to infer what is there on any section of the probe.

Figure 7:
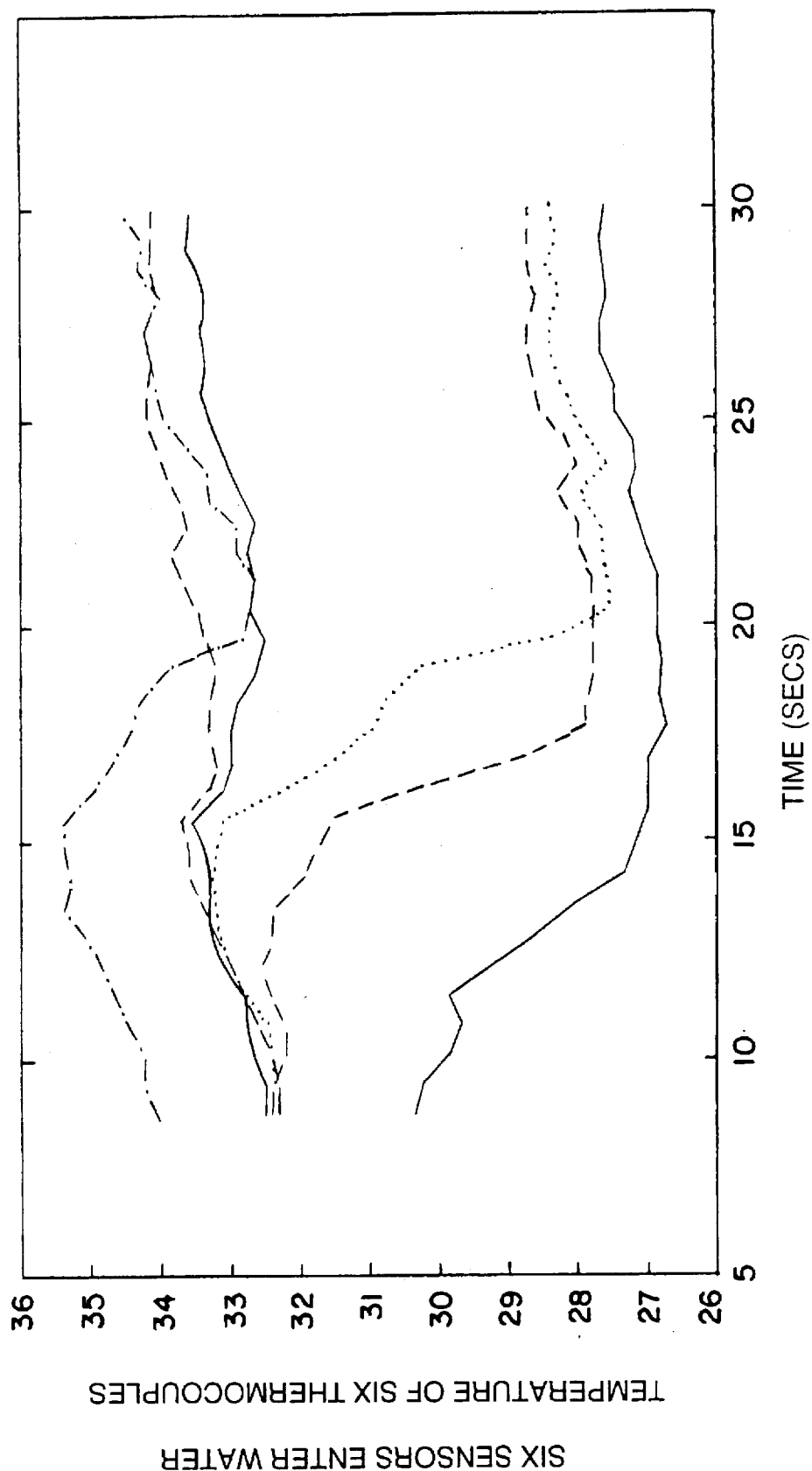
FIG. 7 Temperature behavior of 44, 45 and 46 in water while 41, 42 and 43 in oil.

Further tests of the behavior of the probe when immersed in a body of fluids containing water and oil, wherein the lighter oil stratifies above the water. There is a difference in temperature between that when the probe is in water and when it is in oil, as seen in FIG. 7, Where the probe is moved up and down during the various time periods of the experiment.

The principle of operation described in this invention can also be applied to the measurement of the viscosity of a liquid, because viscosity is a key parameter that determines the convective heat transfer efficiency of the liquid. The lower the viscosity of the liquid the more efficiently it can transfer the heat, and the smaller the temperature difference between the heated surface and the liquid (DT) will be. An increase in viscosity of the liquid, which would result in a higher DT, generally indicates that the lubricating quality of the liquid has deteriorated to some degree. As such, a probe that work on the principle of this invention, can be used to determine whether it is time to replace a liquid, such as lubricating oil in an automotive engine.

The invention described herein can also be used to determine the density of a liquid. By measuring the temperature of the liquid and its pressure (with an appropriate pressure measuring device such as pressure transducer) at the same location, it is possible to compute, with a suitable microprocessor, the density of the liquid.

I claim:

1. Apparatus for determining accurately level in a liquid container, said apparatus comprising:

a coated heater wire in direct contact with the liquid;

the coating of the heater wire is electrically insulating and thermally good conducting;

a plurality of temperature sensors;

said temperature sensor being attached to said heater wore at equally spaced locations;

means for applying electrical power to the heater wire, controlled by a power control switch;

display means located externally to the liquid container;

a microprocessor connected to the temperature sensors and display means to determine the liquid level from the temperatures sensed by the temperature sensor.

2. The apparatus recited in claim 1, wherein said temperature sensors are one of thermocouples and thermistors.

3. The apparatus recited in claim 1, wherein the display is an LED.

4. A method for accurately determining the level in a livid container, said method comprising the steps of:

providing a heater wire;

positioning of a plurality of temperature sensors at predetermined vertically spaced locations on the heater wire;

after zeroing one of the voltage and the temperature reading from all of the temperature sensors with a microprocessor;

applying power to the heater wire;

determining the level of liquid in the container from said one of voltage and temperature from each temperature sensor.

5. The method recited in claim 4, further including using the determination of liquid level to measure liquid viscosity.

6. The method recited in claim 4, including obtaining a pressure reading from a pressure sensor and further determining liquid density.

7. The method recited in claim 4, wherein the determining step includes detecting the presence of two or more different stratified liquids, such as oil and water, and determining the level of each liquid.

8. The method recited in claim 4 wherein the determining step includes detecting the lever at pre-set points at one of the bottom and top of liquid containers such as oil pans, fuel tanks and coolant reservoir by a microprocessor.

9. The claim recited in claim 1 wherein set heater wire is 0.002 inch diameter Nichrome wire which requires low power to operate.

* * * * *